(12) United States Patent
Fackler et al.

(10) Patent No.: US 8,204,771 B1
(45) Date of Patent: Jun. 19, 2012

(54) COMPUTERIZED METHOD AND SYSTEM FOR UPDATING A TASK LIST FROM AN ACTION ITEM DOCUMENTATION VIEW

(75) Inventors: James C. Fackler, Baltimore, MD (US); Deepa R. Desai-Deendar, Shawnee, KS (US); Amy Francois, Lee's Summit, MO (US); Michelle M. Moseman, Kansas City, MO (US); Stephanie L. Rogers, Kansas City, MO (US)

(73) Assignee: Cerner Innovation, Inc., Overland Park, KS (US)

( * ) Notice: Subject to any disclaimer, the term of this patent is extended or adjusted under 35 U.S.C. 154(b) by 1403 days.

(21) Appl. No.: 11/013,716

(22) Filed: Dec. 16, 2004

(51) Int. Cl.
*G06Q 10/00* (2012.01)

(52) U.S. Cl. ...................................... 705/7.11; 705/7.15

(58) Field of Classification Search .................. 705/7.11, 705/7.15
See application file for complete search history.

(56) References Cited

U.S. PATENT DOCUMENTS

| | | | | |
|---|---|---|---|---|
| 5,072,383 | A | * | 12/1991 | Brimm et al. ...................... 705/2 |
| 5,077,666 | A | * | 12/1991 | Brimm et al. ...................... 705/2 |
| 5,348,008 | A | | 9/1994 | Bornn et al. |
| 5,544,649 | A | | 8/1996 | David et al. |
| 5,544,661 | A | | 8/1996 | Davis et al. |
| 5,576,952 | A | | 11/1996 | Stutman et al. |
| 5,678,562 | A | | 10/1997 | Sellers |
| 5,701,894 | A | | 12/1997 | Cherry et al. |
| 5,724,580 | A | | 3/1998 | Levin et al. |
| 5,899,855 | A | | 5/1999 | Brown |
| 5,942,986 | A | | 8/1999 | Shabot et al. |
| 5,987,519 | A | | 11/1999 | Peifer et al. |
| 6,093,146 | A | | 7/2000 | Filangeri |
| 6,102,856 | A | | 8/2000 | Groff et al. |
| 6,154,668 | A | | 11/2000 | Pedersen et al. |
| 6,168,563 | B1 | | 1/2001 | Brown |
| 6,215,403 | B1 | | 4/2001 | Chan et al. |
| 6,225,901 | B1 | | 5/2001 | Kail, IV |
| 6,234,964 | B1 | | 5/2001 | Iliff |
| 6,238,338 | B1 | | 5/2001 | DeLuca et al. |
| 6,245,013 | B1 | | 6/2001 | Minoz et al. |
| 6,254,536 | B1 | | 7/2001 | DeVito |
| 6,278,999 | B1 | | 8/2001 | Knapp |
| 6,292,698 | B1 | | 9/2001 | Duffin et al. |
| 6,304,788 | B1 | | 10/2001 | Eady et al. |
| 6,315,719 | B1 | | 11/2001 | Rode et al. |
| 6,322,502 | B1 | | 11/2001 | Schoenberg et al. |
| 6,398,728 | B1 | | 6/2002 | Bardy |

(Continued)

OTHER PUBLICATIONS

"The diffusion of decision support systems in healthcare: Are we there yet?" / . . . Holly J Wong; Mark W Legnini; Heidi H Whitmore; Roger S Taylor Journal of Healthcare Management; Jul./Aug. 2000; 45, 4; ABI/INFORM Global p. 240.*

(Continued)

*Primary Examiner* — Mark Fleischer (74) *Attorney, Agent, or Firm* — Shook, Hardy & Bacon L.L.P.

(57) ABSTRACT

Methods and systems for updating a task list from an action item documentation view are provided. In one embodiment, a method of the present invention may include receiving an indication that a task view indicator has been selected from the action item documentation view and displaying the task list with a focus on one or more tasks that correspond with the task view indicator selected. The task list displayed may include all tasks due for a particular patient, whether or not information regarding the task may be input in the action item documentation view.

33 Claims, 10 Drawing Sheets

U.S. PATENT DOCUMENTS

| | | | |
|---|---|---|---|
| 6,442,433 B1 | 8/2002 | Linberg | |
| 6,832,199 B1 * | 12/2004 | Kucek et al. | 705/2 |
| 6,893,396 B2 | 5/2005 | Schulze et al. | |
| 6,957,187 B1 * | 10/2005 | Kameda | 705/3 |
| 6,961,586 B2 * | 11/2005 | Barbosa et al. | 455/556.1 |
| 7,260,547 B2 * | 8/2007 | Kameda | 705/3 |
| 7,502,891 B2 * | 3/2009 | Shachor | 711/137 |
| 2002/0082865 A1 * | 6/2002 | Bianco et al. | 705/2 |
| 2002/0188597 A1 * | 12/2002 | Kern et al. | 707/1 |
| 2003/0069759 A1 * | 4/2003 | Smith | 705/3 |
| 2004/0088192 A1 | 5/2004 | Schmidt | |
| 2006/0004609 A1 * | 1/2006 | Kenneth et al. | 705/3 |

OTHER PUBLICATIONS

Office Action mailed Jun. 11, 2008 for U.S. Appl. No. 11/013,719.
Office Action mailed Jun. 25, 2008 for U.S. Appl. No. 11/013,720.
Office Action mailed Mar. 18, 2009 for U.S. Appl. No. 11/013,720.
Office Action mailed Mar. 19, 2009 for U.S. Appl. No. 11/013,719.
Office Action mailed Sep. 1, 2009 for U.S. Appl. No. 11/013,720.
Office Action mailed Sep. 1, 2009 for U.S. Appl. No. 11/013,719.
Office Action mailed Apr. 27, 2010 for U.S. Appl. No. 11/013,720.
Office Action mailed Apr. 27, 2010 for U.S. Appl. No. 11/013,719.
Office Action mailed May 10, 2011 for U.S. Appl. No. 11/013,719.

* cited by examiner

COMPUTERIZED METHOD AND SYSTEM FOR UPDATING A TASK LIST FROM AN ACTION ITEM DOCUMENTATION VIEW

CROSS-REFERENCE TO RELATED APPLICATIONS

This application is related by subject matter to the inventions disclosed in the commonly assigned applications U.S. application Ser. No. 11/013,719, entitled "User Interface for Accessing and Updating a Task List" and U.S. application Ser. No. 11/013,720, entitled "Computerized Method and System for Updating a Task List", both of which were filed on even date herewith.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to methods and systems for use in, e.g., a patient care computing environment, the methods and systems for updating a task list from, for instance, an action item documentation view. Further embodiments of the present invention relate to a user interface for accessing and updating a task list in accordance with one or more of the described methods.

BACKGROUND OF THE INVENTION

In modern clinical settings, there is often an electronic record, e.g., an electronic medical record, associated with each patient presenting at a hospital or clinic. Some electronic records, for instance, an electronic medical record generated by Cerner Millennium available from Cerner Corporation of Kansas City, Mo., have a plurality of sections wherein information regarding various aspects of a patient's visit, as well as historical information and the like, may be input and retrieved. One such section that may be present is a task list. As used herein, the term "task list" refers to a list of reminders or "tasks" for use by a clinician or other care giver indicating that something was, or is, to be done for a particular patient and what was, or is, to be done. That is, "tasks" are reminders to the clinician that, for instance, a medication was, or is, to be given, a vital sign was, or is, to be checked, data was, or is, to be collected, a procedure was, or is, to be performed, or the like. Tasks generally have a time associated therewith which may be a particular instance in time or may indicate that the task is continuous, e.g., an IV medication administered over a period of several hours, and specify only an initiation time and/or a monitoring time. Alternatively, if desired, a time associated with a task may indicate that a task is to be performed only as needed (i.e., PRN).

Tasks are typically generated from orders and specify, with particularity, what is to be done for a patient. Thus, if an order states that a patient is to receive four 20 mg doses of medication X, one dose every three hours beginning at 12:00 pm, four tasks may be generated on the task list associated with the patient: a first task at 12:00 pm, a second task at 3:00 pm, a third task at 6:00 pm, and a fourth task at 9:00 pm, each task indicating that 20 mg of medication X are to be administered.

Another section of an electronic record associated with a particular patient that may be present is an action item documentation view. Such a view, for instance, the "Interactive View" of an electronic medical record generated by Cerner Millennium, provides one or more input fields wherein a clinician or other authorized care giver may input information regarding items for which action is taken. Action items may include, by way of example only, those items for which one or more properties may be documented in an electronic record associated with the patient, for instance, vital signs, medication administration, data collection, and the like.

Typically, once a clinician (or other care giver) has completed an action item and documented any pertinent information in relation thereto in an action item documentation view, he or she must separately access the task list and determine whether the action taken satisfies the completion criteria for any tasks on the task list. That is, if administration of 20 mg of medication X is shown as a task due on the task list at 3:00 pm and the clinician takes such action and documents it in the action item documentation view, he or she must still separately access the task list, determine that administration of medication X at 3:00 pm has been completed, and check off the task as completed. Such duplicated effort is inefficient and time consuming for the care giver.

Accordingly, a method for updating a task list that does not require duplicate documentation of a single action in multiple locations of an electronic record would be desirable. Additionally, a system that permits task lists to remain up-to-date but requires less documentation than prior art systems would be advantageous.

BRIEF SUMMARY OF THE INVENTION

Embodiments of the present invention provide methods for use in, e.g., a patient care computing environment, for updating a task list from an action item documentation view. In one embodiment, the method may include receiving an indication that a task view indicator has been selected from the action item documentation view and displaying the task list with a focus on one or more tasks that correspond with the task view indicator selected. In one embodiment, the method may further include receiving an indication that a particular one of the one or more tasks has been selected for documentation and determining whether the particular one of the one or more tasks that has been selected for documentation is to be documented from the action item documentation view.

If the particular one of the one or more action items that has been selected for documentation is to be documented from the action item documentation view, the method may further comprise displaying the action item documentation view with a first indicator indicating at least one action item for which documentation is required and, if appropriate, a second indicator indicating at least one action item for which documentation is optional. The method may further comprise receiving an indication that at least one patient data element has been documented for one or more action items in the action item documentation window and determining whether the one or more action items for which the at least one patient data element has been documented meets all criteria for completion of the particular one of the one or more tasks. If the one or more action items for which the at least one patient data element has been documented meets all criteria for completion of the particular one of the one or more tasks, the method may further comprise automatically updating the task list in accordance therewith.

If the particular one of the one or more tasks that has been selected for documentation is not to be documented from the action item documentation view, the method may further comprise displaying a second documentation view corresponding to the particular one of the one or more tasks that has been selected for documentation. The method may further comprise receiving an indication that at least one patient data element has been documented for the one or more action items in the second documentation view and determining whether the one or more action items for which the at least one patient data element has been documented meets all criteria for completion of the particular one of the one or more tasks. If the one or more action items for which the at least one patient data element has been documented meets all criteria for completion of the particular one of the one or more tasks, the method may further comprise automatically updating the task list in accordance therewith. In one embodiment, the method may further comprise automatically updating the action item documentation view in accordance with the at least one patient data element, if appropriate.

Additionally, embodiments of the present invention provide computer systems and computer-readable media for performing the methods herein disclosed.

BRIEF DESCRIPTION OF THE SEVERAL VIEWS OF THE DRAWING

The present invention is described in detail below with reference to the attached drawing figures, wherein:

FIG. 6 is an illustrative screen display of a documentation view accessible by selection of one of the selectable task links shown in FIG. 5 in accordance with an embodiment of the present invention;

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention provides a computerized method and system for updating a task list from, e.g., an action item documentation view. The present invention further provides a user interface for accessing and updating a task list. An exemplary operating environment for the present invention is described below.

Figure 1:
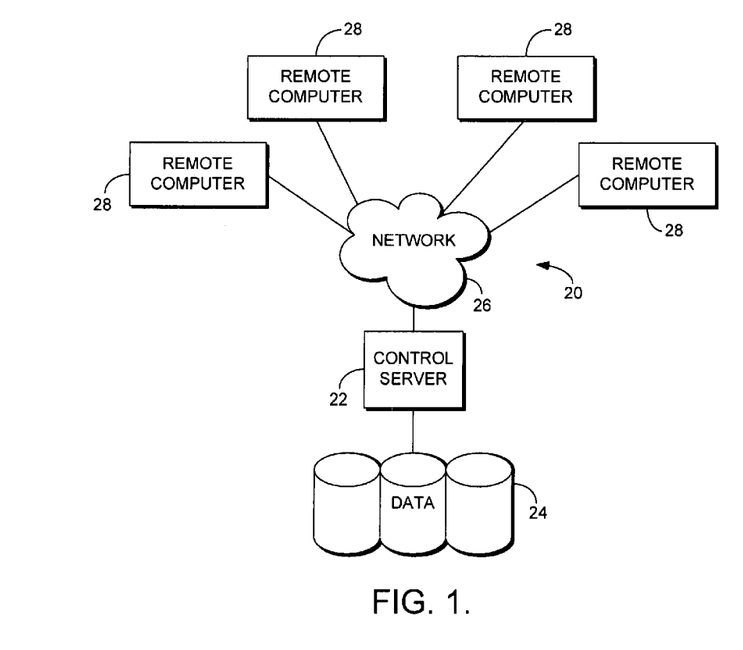
FIG. 1 is a block diagram of an exemplary computing system environment suitable for use in implementing the present invention.

Referring to the drawings in general, and initially to FIG. 1 in particular, an exemplary computing system environment, for instance, a medical information computing system, on which the present invention may be implemented is illustrated and designated generally as reference numeral 20. It will be understood and appreciated by those of ordinary skill in the art that the illustrated medical information computing system environment 20 is merely an example of one suitable computing environment and is not intended to suggest any limitation as to the scope of use or functionality of the invention. Neither should the medical information computing system environment 20 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 1, the exemplary medical information computing system environment 20 includes a general purpose computing device in the form of a control server 22. Components of the control server 22 may include, without limitation, a processing unit, internal system memory, and a suitable system bus for coupling various system components, including database cluster 24, with the control server 22. The system bus may be any of several types of bus structures, including a memory bus or memory controller, a peripheral bus, and a local bus, using any of a variety of bus architectures. By way of example, and not limitation, such architectures include Industry Standard Architecture (ISA)

bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 22 typically includes therein, or has access to, a variety of computer-readable media, for instance, database cluster 24. Computer-readable media can be any available media that may be accessed by control server 22, and includes volatile and nonvolatile media, as well as removable and nonremovable media. By way of example, and not limitation, computer-readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by control server 22. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 24, provide storage of computer-readable instructions, data structures, program modules, and other data for control server 22.

The control server 22 may operate in a computer network 26 using logical connections to one or more remote computers 28. Remote computers 28 may be located at a variety of locations in a medical environment, for example, but not limited to, clinical laboratories, hospitals and other inpatient settings, ambulatory settings, medical billing and financial offices, hospital administration settings, home health care environments, and clinicians' offices. Clinicians may include, but are not limited to, a treating physician or physicians, specialists such as surgeons, radiologists and cardiologists, emergency medical technicians, physicians' assistants, nurse practitioners, nurses, nurses' aides, pharmacists, dieticians, microbiologists, and the like. Remote computers 28 may also be physically located in non-traditional medical care environments so that the entire health care community may be capable of integration on the network. Remote computers 28 may be personal computers, servers, routers, network PCs, peer devices, other common network nodes, or the like, and may include some or all of the elements described above in relation to the control server 22.

Exemplary computer networks 26 may include, without limitation, local area networks (LANs) and/or wide area networks (WANs). Such networking environments are commonplace in offices, enterprise-wide computer networks, intranets, and the Internet. When utilized in a WAN networking environment, the control server 22 may include a modem or other means for establishing communications over the WAN, such as the Internet. In a networked environment, program modules or portions thereof may be stored in the control server 22, in the database cluster 24, or on any of the remote computers 28. For example, and not by way of limitation, various application programs may reside on the memory associated with any one or more of the remote computers 28. It will be appreciated by those of ordinary skill in the art that the network connections shown are exemplary and other means of establishing a communications link between the computers (e.g., control server 22 and remote computers 28) may be utilized.

In operation, a user may enter commands and information into the control server 22 or convey the commands and information to the control server 22 via one or more of the remote computers 28 through input devices, such as a keyboard, a pointing device (commonly referred to as a mouse), a trackball, or a touch pad. Other input devices may include, without limitation, microphones, satellite dishes, scanners, or the like. The control server 22 and/or remote computers 28 may include other peripheral output devices, such as speakers and a printer.

Although many other internal components of the control server 22 and the remote computers 28 are not shown, those of ordinary skill in the art will appreciate that such components and their interconnection are well known. Accordingly, additional details concerning the internal construction of the control server 22 and the remote computers 28 are not further disclosed herein.

Figure 2:
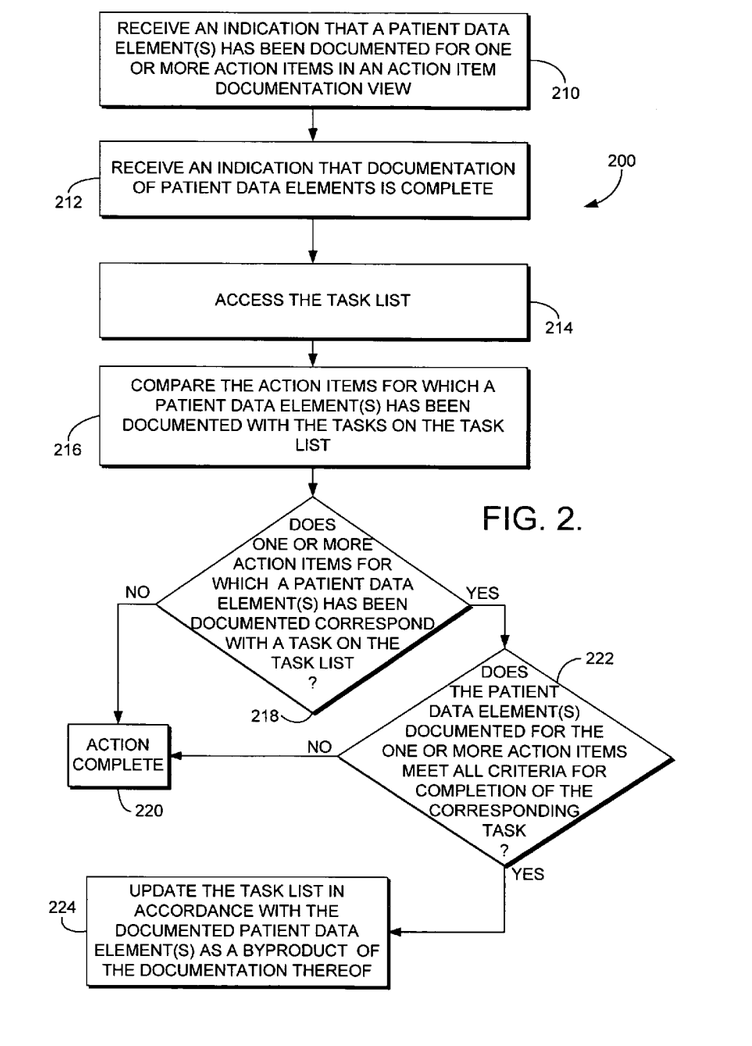
FIG. 2 is a flow chart representative of a computer program for updating a task list in accordance with an embodiment of the present invention.

As previously mentioned, the present invention relates, in part, to a computerized method and system for use in, e.g., a patient care computing environment, for updating a task list. With reference to FIG. 2, a flow chart representative of a method for such task list updating in accordance with an embodiment of the present invention is illustrated and depicted generally as reference numeral 200. Method 200 may be implemented on the above-described exemplary computing system environment (FIG. 1) and, by way of example only, may be utilized by a clinician to automatically update a task list as a byproduct of documenting one or more action items in an action item documentation view of an electronic record (e.g., an electronic medical record) associated with a patient. (The terms "individual", "person", and "patient" are used interchangeably herein and are not meant to limit the nature of the referenced individual in any way. Rather, the methods and systems described herein are equally applicable in, for instance, a veterinary setting. Further, use herein of the term "patient" is not meant to imply any particular relationship between the individual in question and those documenting one or more action items associated with the individual.)

Initially, as shown at block 210, the system receives an indication that at least one patient data element has been documented for one or more action items in an action item documentation view, e.g., the "Interactive View" of an electronic medical record generated by Cerner Millennium available from Cerner Corporation of Kansas City, Mo. As used herein, the term "action item" refers to those items for which one or more properties may be documented in an electronic record associated with the patient. The term "patient data element", as used herein, refers to the value of property documented. Thus, by way of example only, a clinician or other authorized care giver may document a vital sign, e.g., the heart rate, of an Intensive Care Unit (ICU) patient in an action item documentation view. In this scenario, the vital sign (heart rate) itself is viewed as the "action item" and the value of the vital sign, e.g., the value of the patient's heart rate as 98, is viewed as the patient data element.

Subsequently, as shown at block 212, the system receives an indication that documentation of patient data elements is complete. That is, the clinician or other authorized care giver effectively "signs off" on the patient's electronic record indicating that he or she has completed documentation of patient data elements for the present time and an indication that such action has been taken is received by the system.

Next, the system accesses a task list associated with the patient, as shown at block 214. As previously described, the term "task list" refers to a list of reminders or "tasks" for use by a clinician or other care giver indicating that something was, or is, to be done for a particular patient and what was, or is, to be done. That is, "tasks" are reminders to the clinician that, for instance, a medication was, or is, to be given, a vital sign was, or is, to be checked, data was, or is, to be collected, a procedure was, or is, to be performed, or the like. Tasks generally have a time associated therewith which may be a particular instance in time (typically with a small time window on either side thereof representing a time range). Additionally, a time associated with a task may indicate that the task is continuous, e.g., an IV medication administered over a period of several hours, and specify only an initiation time and/or a monitoring time. Alternatively, if desired, a time associated with a task may indicate that a task is to be performed only as needed (i.e., PRN).

Figure 3:
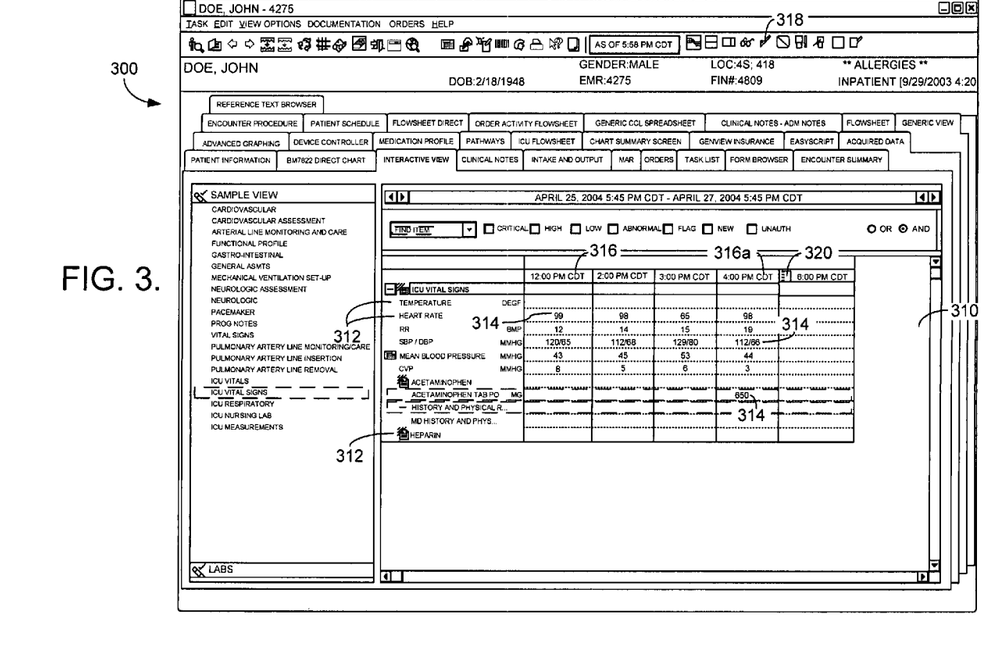
FIG. 3 is an illustrative screen display of an action item documentation view in accordance with an embodiment of the present invention.

An exemplary screen display, depicted generally as reference numeral 300, illustrating an embodiment of a user interface which may be utilized with the methods herein described is shown in FIG. 3. The screen display 300 of FIG. 3 includes an action item documentation view 310 configured to display one or more action items 312 for which corresponding patient data elements 314 may be documented by a user at one or more time instances 316. By way of example only, contemplate that at or near 4:00 pm CDT, a clinician (or other authorized care giver) takes patient Mr. Doe's heart rate and blood pressure and documents them as 98 and 112/66, respectively, in the action item documentation view 310 in the column representing time instance 4:00 pm CDT 316a. Shortly thereafter, the care giver administers 650 mg of acetaminophen and documents such action in the same column 316a. The care giver then selects the completion indicator 318 indicating that documentation of patient data elements is complete at the present time.

With reference back to FIG. 2, the system subsequently compares the action items for which at least one patient data element has been documented with the tasks on the task list, as shown at block 216, to determine whether any of the action items for which at least one patient data element has been documented correspond with one or more tasks on the task list. This determination is shown at block 218. If it is determined that none of the action items for which at least one patient data element has been documented correspond with one or more tasks on the task list, the method is complete, as shown at block 220. If, however, it is determined that one or more of the action items for which at least one patient data element has been documented corresponds with one or more tasks on the task list, the system next determines whether the at least one patient data element documented for the one or more action items meets all criteria for completion of at least one of the one or more corresponding tasks on the task list. This is shown at block 222. If it is determined that the patient data elements for the action items do not meet all criteria for completion of at least one of the one or more corresponding tasks on the task list, the method is complete, as indicated at block 220.

Contemplate that in the above-described exemplary scenario, the task list for patient John Doe indicates that at 4:00 pm CDT, two tasks are to be completed: vital signs are to be taken (which includes temperature, heart rate and blood pressure) and 650 mg of acetaminophen are to be administered. The system accesses the task list and compares the action items for which patient data elements have been documented (i.e., heart rate, blood pressure and administration of acetaminophen) with the tasks on the task list to determine whether one or more of the action items for which a patient data element has been documented corresponds with a task on the task list. In this example, vital signs (including temperature, heart rate and blood pressure) and administration of acetaminophen are tasks on the task list for the time instance 4:00 pm CDT. Thus, it is determined that two tasks correspond to the action items for which patient data elements have been documented.

The system next determines whether the patient data element(s) documented for the action items meet all criteria for completion of at least one of the two corresponding tasks on the task list. As specified on the task list, completion of the vital signs task requires that temperature, heart rate and blood pressure are to be taken and documented for completion thereof. While heart rate and blood pressure were taken and documented by the care giver, Mr. Doe's temperature was not documented and, accordingly, the patient data elements documented (heart rate 98, blood pressure 112/66) do not meet all criteria for completion of the corresponding task. Thus, as to this task, the method is complete.

However, as specified on the task list, the acetaminophen administration task requires that 650 mg of acetaminophen be administered at or near 4:00 pm CDT. The care giver has documented that administration of the medication has taken place within the appropriate time frame and, accordingly, all criteria for completion of the task have been met.

Next, as indicated at block 224 of FIG. 2, the system updates the task list in accordance with the documented patient data element(s) as a byproduct of the documentation thereof. That is, the system automatically updates the task list without the user having to separately access the task list and indicate that the appropriate tasks have been completed.

Thus, in the above-described exemplary scenario, the system automatically updates the task list associated with Mr. Doe's electronic record to indicate that acetaminophen administration at 4:00 pm CDT has been completed. Note, however, that as temperature has not been taken, the vital signs task will remain on Mr. Doe's task list.

It should be noted that the updated task information may be captured by the system and output in an audit log, if desired. Thus, in the above-described scenario, an audit log associated with Mr. Doe's electronic record may be automatically updated to reflect completion of the acetaminophen administration task.

Figure 4:
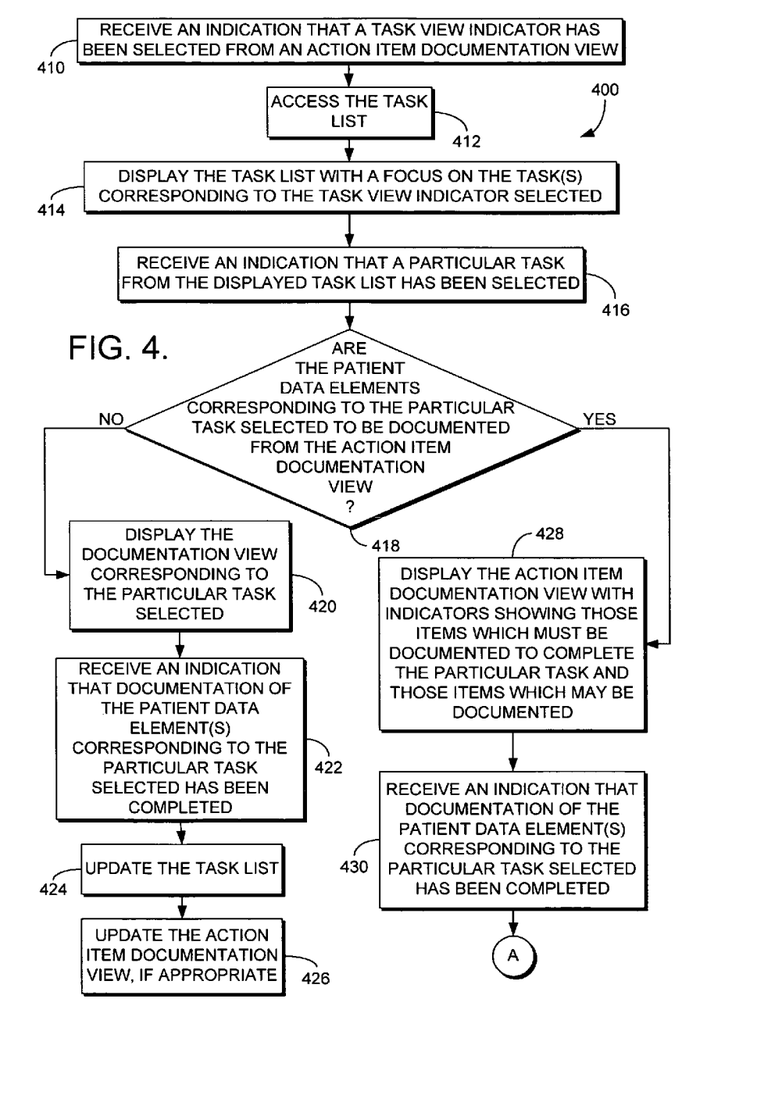
FIG. 4 is a flow chart representative of a computer program for updating a task list from an action item documentation view in accordance with an embodiment of the present invention.

In another embodiment, the present invention relates to a computerized method and system for use in, e.g., a patient care computing environment, for updating a task list from an action item documentation view, for example the action item documentation view 310 of FIG. 3. With reference to FIG. 4, a flow chart representative of a method for updating a task list in accordance with this embodiment of the present invention is illustrated and depicted generally as reference numeral 400. Method 400 may be implemented on the above-described exemplary computing system environment (FIG. 1) and, by way of example only, may be utilized by a clinician to update a task list from an action item documentation view as a byproduct of documenting one or more action items associated with a patient, as more fully described below.

Initially, as shown at block 410, the system receives an indication that a task view indicator has been selected from an action item documentation view. With reference to the action item documentation view 310 of FIG. 3, a task view indicator is shown and depicted as reference numeral 320. The task view indicator 320 is shown as a selectable rectangular indicator positioned in proximity to the column representing the time instance to which it corresponds, as more fully described below. It will be understood and appreciated by those of ordinary skill in the art, however, that many different configurations for the task view indicator may be utilized and the rectangular representation shown, nor the placement thereof, is not intended to limit the scope of the present invention in any way.

As contemplated by this embodiment of the present invention, a task view indicator is displayed in an action item documentation view only if one or more tasks are due and remain uncompleted for the patient whose electronic record is being viewed. As tasks are typically associated with a particular time instance, the task view indicator is accordingly shown in association with any time instance for which there are uncompleted tasks. Thus, the task view indicator 320 of FIG. 3 indicates that there are one or more uncompleted tasks associated with the 6:00 pm CDT time instance but that all tasks associated with the time instances 12:00 pm CDT; 2:00 pm CDT, 3:00 pm CDT and 4:00 pm CDT have been completed. (Note that if no tasks were scheduled for completion at a particular time instance, there would likely not be a column representing that time instance displayed in the action item documentation view 310.)

With reference back to FIG. 4, once the system has received an indication that a task view indicator has been selected from an action item documentation view, the system accesses the task list associated with the patient whose electronic record is being viewed, as indicated at block 412. In one embodiment, the task list accessed is the entire task list associated with the patient, having all tasks scheduled, for instance, within a given twenty-four hour period of time having both completed and uncompleted tasks listed thereon (with an indication into which category they fall). However, if desired, upon selection of the task view indicator, the task list may be displayed with a focus on the task or tasks corresponding to the task view indicator selected, as shown at block 414. Thus, by way of example only, upon selection of the task view indicator 320 of FIG. 3, the task list for John Doe may be accessed and displayed with a focus on those tasks which remain uncompleted for the 6:00 pm CDT time instance.

Once the task list has been displayed, the system receives an indication that a particular task has been selected, as indicated at block 416. Next, the system determines whether the particular one of the one or more tasks that has been selected for documentation is to be documented from the action documentation view or from another supported input format. This is shown at block 418.

Figure 5:
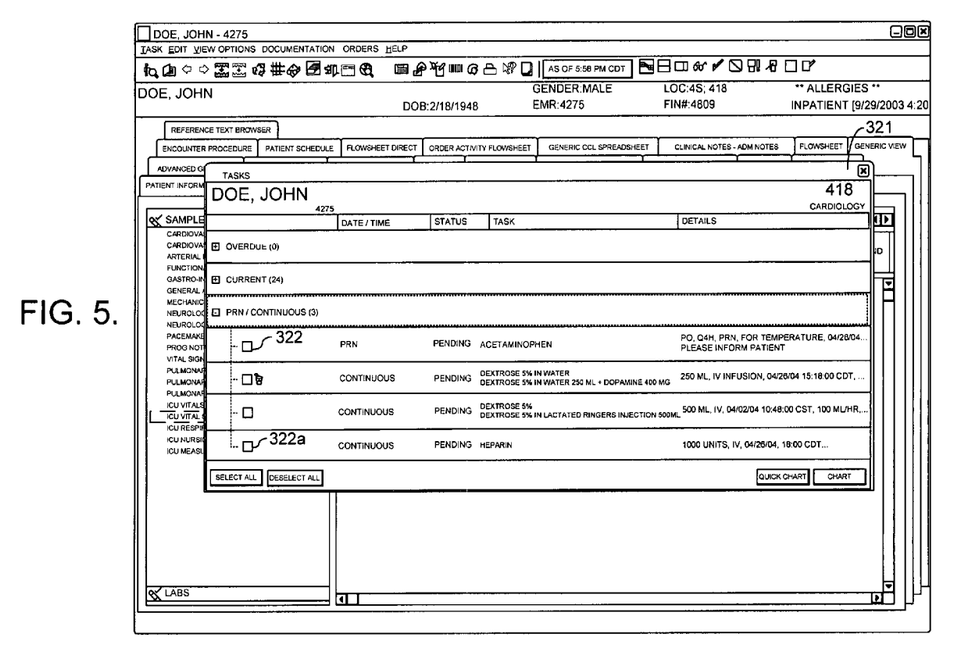
FIG. 5 is an illustrative screen display of a task list view accessible by selection of the selectable task view indicator of FIG. 3 in accordance with an embodiment of the present invention.

With reference to FIG. 5, an exemplary screen display is illustrated showing a task list view 321 accessible by selection of the task view indicator 320 of FIG. 3 for patient John Doe. The task list view 321 illustrates a number of tasks which are due for the 6:00 pm CDT time instance (each of which is to be acted upon continuously or as needed). Associated with each task is a selectable task link 322, selection of which allows a user to navigate to a documentation view wherein information regarding completion of the task may be input, as more fully described below. Thus, if a user were to select the selectable task link 322a associated with the administration of heparin task in the task list view 321 of FIG. 3, the system would determine whether the patient data elements corresponding to the administration of heparin task are to be documented from the action item documentation view or from another supported input format.

Referring back to FIG. 4, as shown at block 420, if it is determined that the patient elements corresponding to the particular task selected are not to be documented from the action item documentation view, the system displays the documentation view which corresponds to the selected task. That is, if the particular task selected is to be documented in a format other than the action item documentation view, e.g., if the particular task selected is to be documented in a supported structured documentation format, the system displays the documentation view appropriate for documentation of the task.

With reference to FIG. 6, an exemplary screen display is illustrated showing an alternative documentation view for the heparin administration task shown in the task list view 321 of FIG. 5. The documentation view 324 of FIG. 6 is accessible by selection of the selectable task link 322a associated with the heparin administration task in the task list view 321 of FIG. 5. The documentation view 324 is configured to receive input of at least one patient data element 326 associated with completion of the task associated therewith, that is, the heparin administration task. The documentation view 324 further includes a selectable completion indicator 328, selection of which allows a user to navigate to an updated action item documentation view, as more fully described below.

Referring back to FIG. 4, the system subsequently receives an indication that documentation of the patient data element(s) corresponding to the particular task selected, e.g., the heparin administration task, has been completed. For instance, in the documentation view 324 of FIG. 6, the system would receive an indication that a user has selected the selectable completion indicator 328 to indicate that he or she has completed documentation of patient data elements 326.

Next, as indicated at block 424, the system automatically updates the task list as a byproduct of the documentation of the patient data elements, as hereinabove described with reference to FIG. 2. Additionally, if appropriate, the action item documentation view may be automatically updated as well, as indicated at block 426.

Figure 7:
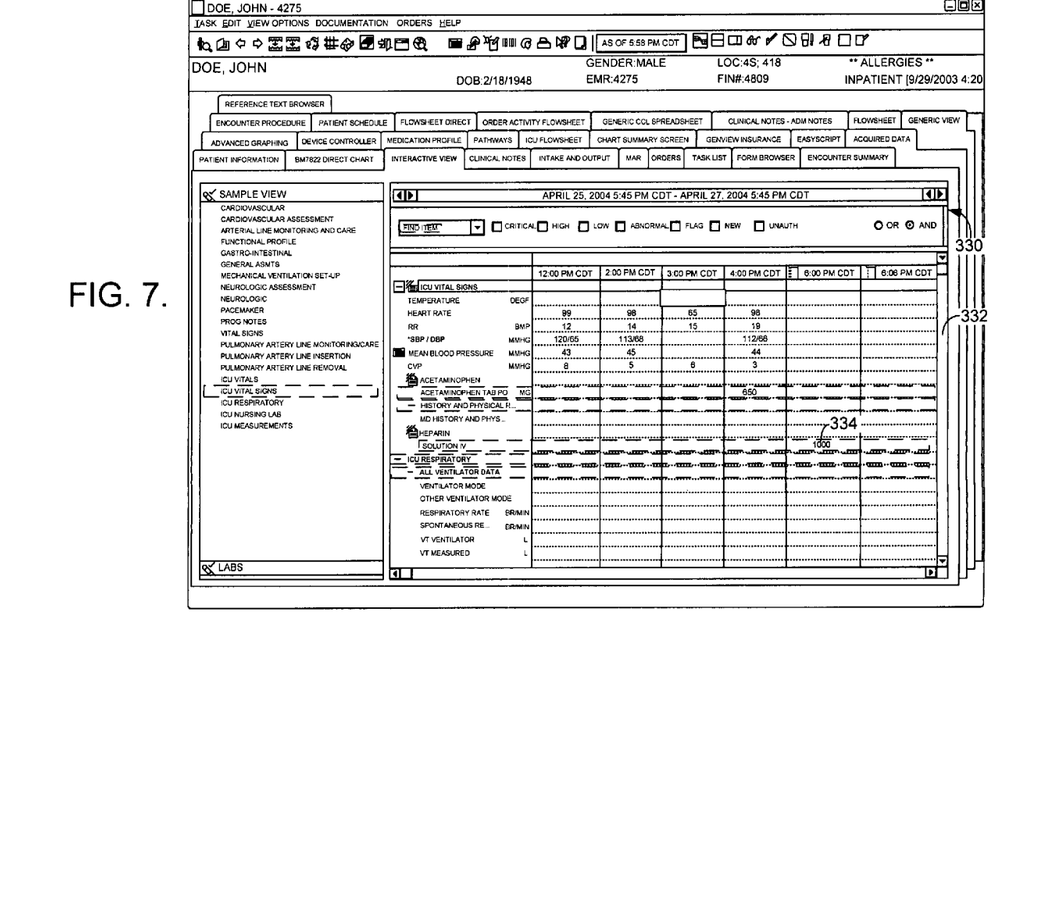
FIG. 7 is an illustrative screen display of an updated action item documentation view showing documentation of a portion of the patient data elements input in the documentation view of FIG. 6 in accordance with an embodiment of the present invention.

Referring back to the exemplary scenario hereinabove described, upon entry of the patient data elements indicating that IV administration of 1000 units of heparin was begun by the care giver at 6:00 pm CDT and selection of the selectable completion indicator 328 of FIG. 6, the task list associated with John Doe is automatically updated to indicate that the heparin administration task has been completed. Additionally, with reference to FIG. 7, an updated action item documentation view 330 may be displayed which includes a patient data element display area 332 wherein at least a portion of the patient data element(s) input in association with the heparin administration task may be displayed, as indicated by reference numeral 334.

Referring back to FIG. 4, if it is determined at block 418 that the patient data elements corresponding to the particular task selected are to be documented from the action item documentation view, the system may subsequently display the action item documentation view with indicators showing those action items for which at least one patient data element must be documented to complete the particular task (required patient data elements(s)) and those action items for which at least one patient data element may be documented to complete the particular task (optional patient data element(s)). This is shown at block 428.

Figure 8:
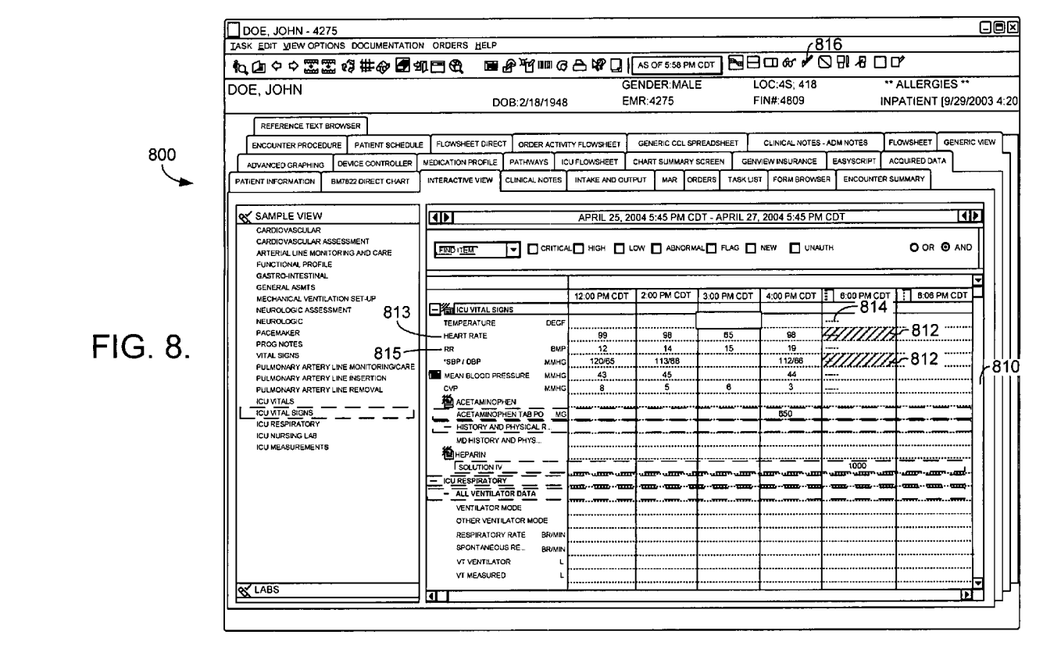
FIG. 8 is an illustrative screen display in accordance with an embodiment of the present invention of a modified action item documentation view similar to that shown in FIG. 3 having indicators indicating action items for which input of at least one patient data element is required and action items for which input of at least one patient data element is optional for completion of a task associated with one of the selectable task links shown in FIG. 5.

With reference to FIG. 8, an exemplary screen display showing a modified action item documentation view 800 having a patient element display area 810 configured to display indicators 812 indicative of one or more action items 813 for which at least one patient data element must be documented to complete the particular task and indicators 814 indicative of one or more action items 815 for which at least one patient data element may be documented to complete the particular task is illustrated. The indicators 812 representing those action items 813 for which at least one patient data element must be documented are shaded patient data element entry fields shown in the column corresponding to the time instance for which entry is required. A number of dashes indicate the format in which the required patient data element is to be entered. The indicators 814 representing those action items 815 for which at least one patient data element may be documented are un-shaded patient data element entry fields show in the column corresponding to the time instance for which entry is optional. A number of dashes indicate the entry format in which the optional patient data element is to be entered. It will be understood and appreciated by those of ordinary skill in the art that the illustrated indicators are illustrative only and are not intended to limit the scope of the invention in any way. Any variety of different indicators, for instance, symbols or colored fields, may be utilized and all such variations are contemplated to be within the scope hereof.

With reference back to FIG. 4, once entry of the required and/or optional patient data elements has been completed, the system receives an indication that documentation of the patient data element(s) corresponding to the particular task selected has been completed, as shown at block 430. With reference to FIG. 8, a selectable completion indicator 816 is shown and indicated by reference numeral 816, selection of which is an indication to the system that patient data element documentation is complete.

Subsequently, as shown at block 432, it is determined whether the patient data element(s) documented meet all criteria for completion of the particular task, as hereinabove described with reference to FIG. 2. If not, the method is complete, as indicated at block 434. However, if it is determined that the patient data element(s) documented meet all criteria for completion of the particular task, the task list is subsequently updated in accordance with the documented patient data element(s) as a byproduct of the documentation thereof, as shown at block 436.

Figure 9:
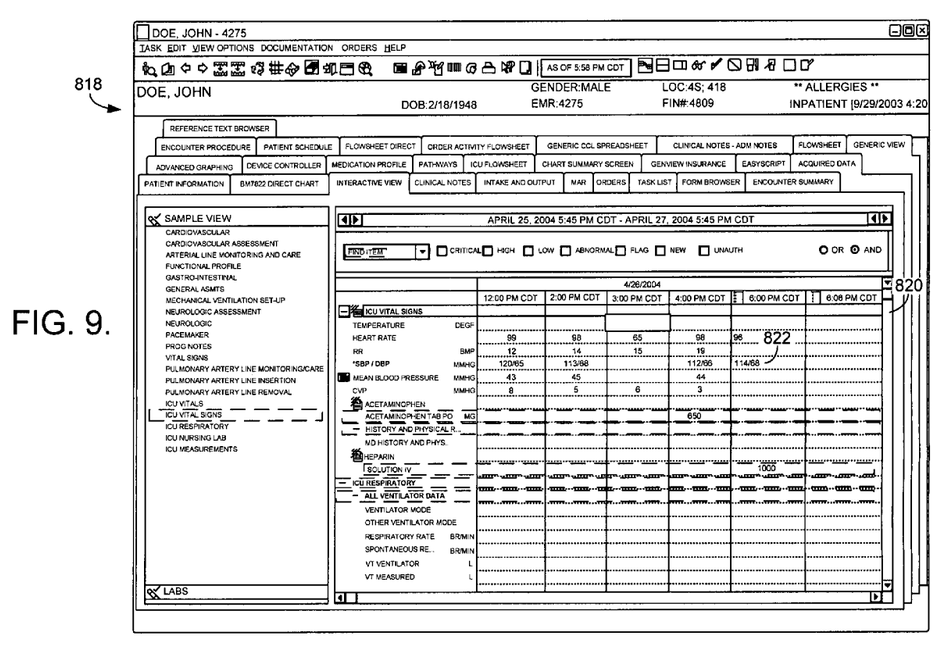
FIG. 9 is an illustrative screen display of an updated action item documentation view showing documentation of a portion of the patient data element(s) input in the modified action item documentation view of FIG. 8 in accordance with an embodiment of the present invention.

With reference to FIG. 9, an exemplary screen display illustrative an updated action item documentation view 818 including a patient data element display area 820 configured to display at least a portion of at least one patient data element 822 which may be input with regard to completion of the selected task. In the illustrated embodiment, the two required patient data elements (heart rate and blood pressure) were input by the user and thus the task associated therewith has been completed.

As can be understood, embodiments of the present invention provide a computerized method and system for updating a task list from, e.g., an action item documentation view. Embodiments of the present invention further provide a user interface for accessing and updating a task list. The present invention has been described in relation to particular embodiments, which are intended in all respects to be illustrative rather than restrictive. Alternative embodiments will become apparent to those of ordinary skill in the art to which the present invention pertains without departing from its scope. For instance, embodiments of the present invention may provide an action item documentation view which includes task-related information pertaining to a single patient, as hereinabove described, multiple patients, and/or multiple care givers. Accordingly, the action item documentation view may be viewed from the perspective of a user providing patient care or from a supervisory perspective, e.g., a nurse manager viewing the tasks relating to the patients of multiple nurses. All such variations are contemplated to be within the scope hereof.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A computer-implemented method in a computing system environment for updating a task list from an action item documentation view, the method comprising:

receiving, as a first computing process, an indication that a task view indicator has been selected from the action item documentation view, wherein the task view indicator is a selectable indicator associated with a specific time instance and positioned on a display device such that the task view indicator is adjacent to an indicator of the specific time instance associated therewith, wherein the task view indicator is displayed only when one or more tasks associated with the specific time instance remain uncompleted, wherein the one or more tasks is an indication of a healthcare order to be performed, and wherein the one or more tasks includes one or more action items for which one or more patient data elements are documented, and wherein an action item is an item for which a value is documented and a patient data element is the value;

in response to receiving the indication that the task view indicator associated with the specific time instance has been selected, displaying, as a second computing process, a focused task list with a focus on one or more uncompleted tasks that correspond with the specific time instance associated with the task view indicator selected, the focused task list being displayed only in response to the selection of the task view indicator and the focused task list only displaying uncompleted tasks associated with the specific time instance of the selected task view indicator;

receiving an indication that a particular one of the one or more tasks has been selected for documentation;

determining whether the particular one of the one or more tasks that has been selected for documentation is to be documented from the action item documentation view; and determining whether the one or more action items of the particular one of the one or more tasks meets all criteria for completion, and wherein the first and second computing processes are executed utilizing one or more computing devices.

2. The method of claim 1, wherein if the particular one of the one or more tasks that has been selected for documentation is to be documented from the action item documentation view, the method further comprises displaying the action item documentation view with a first indicator indicating at least one action item for which documentation is required.

3. The method of claim 2, further comprising displaying the action item documentation view with a second indicator indicating at least one action item for which documentation is optional.

4. The method of claim 2, further comprising receiving an indication that at least one patient data element has been documented for one or more action items in the action item documentation view.

5. The method of claim 4, wherein the one or more action items for which the at least one patient data element has been documented meets all criteria for completion of the particular one of the one or more tasks based on identifying documentation of each of the one or more patient data elements for the one or more action items of the particular one of the one or more tasks.

6. The method of claim 5, wherein if the one or more action items for which the at least one patient data element has been documented meets all criteria for completion of the particular one of the one or more tasks, the method further comprises automatically updating the task list in accordance therewith.

7. The method of claim 1, wherein if the particular one of the one or more tasks that has been selected for documentation is not to be documented from the action item documentation view, the method further comprises displaying a second documentation view corresponding to the particular one of the one or more tasks that has been selected for documentation.

8. The method of claim 7, further comprising receiving an indication that at least one patient data element has been documented for the one or more action items in the second documentation view.

9. The method of claim 8, further comprising determining whether the one or more action items for which the at least one patient data element has been documented meets all criteria for completion of the particular one of the one or more tasks.

10. The method of claim 9, wherein if the one or more action items for which the at least one patient data element has been documented meets all criteria for completion of the particular one of the one or more tasks, the method further comprises automatically updating the task list in accordance therewith.

11. The method of claim 9, further comprising automatically updating the action item documentation view in accordance with the at least one documented patient data element.

12. A computer system including one or more computer-readable storage media having computer-executable components stored thereon for updating a task list from an action item documentation view, the computer-executable components comprising:
   a first receiving device for receiving an indication that a task view indicator has been selected from the action item documentation view, wherein the task view indicator is a selectable indicator associated with a specific time instance and positioned on a display device such that the task view indicator is adjacent to an indicator of the specific time instance associated therewith, wherein the task view indicator is displayed only when one or more tasks associated with the specific time instance remain uncompleted, and wherein the one or more tasks is an indication of a healthcare order to be performed;
   a second receiving device for receiving an indication that a particular one of the one or more tasks has been selected for documentation;
   a first display device for displaying a focused task list with a focus on one or more uncompleted tasks that correspond with the specific time instance associated with the task view indicator selected, wherein the focused task list is displayed only as a result of receiving the indication that the task view indicator associated with the specific time instance has been selected from the action item documentation view and only displays uncompleted tasks that correspond to the specific time instance associated with the task view indicator;
   a first determining device for determining whether the particular one of the one or more tasks that has been selected for documentation is to be documented from the action item documentation view; and
   a second determining device for determining whether the one or more action items of the particular one of the one or more tasks meets all criteria for completion.

13. The computer system of claim 12, wherein if the particular one of the one or more tasks that has been selected for documentation is to be documented from the action item documentation view, the computer system further comprises a second display device for displaying the action item documentation view with a first indicator indicating at least one action item for which documentation is required.

14. The computer system of claim 13, wherein the second display device is capable of displaying the action item documentation view with a second indicator indicating at least one action item for which documentation is optional.

15. The computer system of claim 12, further comprising a third receiving device for receiving an indication that at least one patient data element has been documented for one or more action items in the action item documentation view.

16. The computer system of claim 15, wherein the one or more action items for which the at least one patient data element has been documented meets all criteria for completion of the particular one of the one or more tasks.

17. The computer system of claim 16, wherein if the one or more action items for which the at least one patient data element has been documented meets all criteria for completion of the particular one of the one or more tasks, the computer system further comprises an updating module for automatically updating the task list in accordance therewith.

18. The computer system of claim 12, wherein if the particular one of the one or more tasks that has been selected for documentation is not to be documented from the action item documentation view, the computer system further comprises a second display module for displaying a second documentation view corresponding to the particular one of the one or more tasks that has been selected for documentation.

19. The computer system of claim 18, further comprising a third receiving device for receiving an indication that at least one patient data element has been documented for one or more action items in the second documentation view.

20. The computer system of claim 19, further comprising a second determining device for determining whether the one or more action items for which the at least one patient data element has been documented meets all criteria for completion of the particular one of the one or more tasks.

21. The computer system of claim 20, wherein if the one or more action items for which the at least one patient element has been documented meets all criteria for completion of the particular one of the one or more tasks, the computer system further comprises an updating module for automatically updating the task list in accordance therewith.

22. The computer system of claim 20, further comprising automatically updating the action item documentation view in accordance with the at least one documented patient data element.

23. A non-transitory computer-readable medium having computer-executable instructions for performing a method in a computing system environment for updating a task list from an action item documentation view, the method comprising:
   receiving an indication that a task view indicator has been selected from the action item documentation view, wherein the task view indicator is a selectable indicator associated with a specific time instance and positioned on a display device such that the task view indicator is adjacent to an indicator of the specific time instance associated therewith, wherein the task view indicator is displayed only when one or more tasks associated with the specific time instance remain uncompleted, and wherein the one or more tasks is an indication of a healthcare order to be performed;

in response to receiving the indication that the task view indicator has been selected, displaying a focused task list with a focus on one or more uncompleted tasks that correspond with the specific time instance associated with the task view indicator selected, the focused task list being displayed only in response to the selection of the task view indicator and the focused task list only displayed uncompleted tasks associated with the specific time instance of the selected task view indicator;

receiving an indication that a particular one of the one or more tasks has been selected for documentation;

determining whether the particular one of the one or more tasks that has been selected for documentation is to be documented from the action item documentation view; and determining whether the one or more action items of the particular one of the one or more tasks meets all criteria for completion.

24. The computer-readable medium of claim 23, wherein if the particular one of the one or more tasks that has been selected for documentation is to be documented from the action item documentation view, the method further comprises displaying the action item documentation view with a first indicator indicating at least one action item for which documentation is required.

25. The computer-readable medium of claim 24, wherein the method further comprises displaying the action item documentation view with a second indicator indicating at least one action item for which documentation is optional.

26. The computer-readable medium of claim 24, wherein the method further comprises receiving an indication that at least one patient data element has been documented for one or more action items in the action item documentation view.

27. The computer-readable medium of claim 26, wherein the one or more action items for which the at least one patient data element has been documented meets all criteria for completion of the particular one of the one or more tasks.

28. The computer-readable medium of claim 27, wherein if the one or more action items for which the at least one patient data element has been documented meets all criteria for completion of the particular one of the one or more tasks, the method further comprises automatically updating the task list in accordance therewith.

29. The computer-readable medium of claim 23, wherein if the particular one of the one or more tasks that has been selected for documentation is not to be documented from the action item documentation view, the method further comprises displaying a second documentation view corresponding to the particular one of the one or more tasks that has been selected for documentation.

30. The computer-readable medium of claim 29, wherein the method further comprises receiving an indication that at least one patient data element has been documented for one or more action items in the second documentation view.

31. The computer-readable medium of claim 30, wherein the method further comprises determining whether the one or more action items for which the at least one patient data element has been documented meets all criteria for completion of the particular one of the one or more tasks.

32. The computer-readable medium of claim 31, wherein if the one or more action items for which the at least one patient data element has been documented meets all criteria for completion of the particular one of the one or more tasks, the method further comprises automatically updating the task list in accordance therewith.

33. The computer-readable medium of claim 31, further comprising automatically updating the action item documentation view in accordance with the at least one documented patient data element.

* * * * *